Sept. 12, 1933.  W. B. KENNEDY  1,926,949
HOSE COUPLING
Filed July 15, 1932
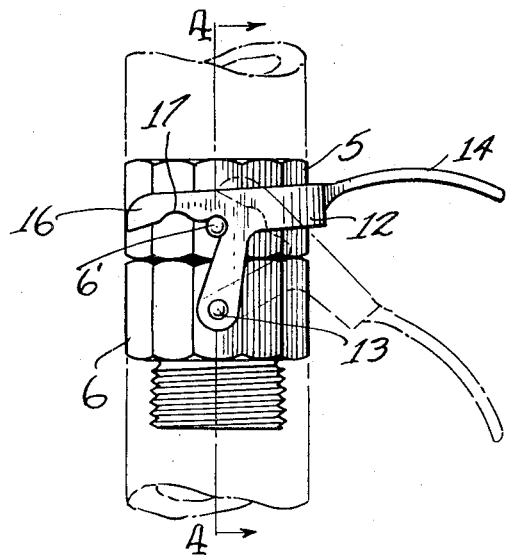
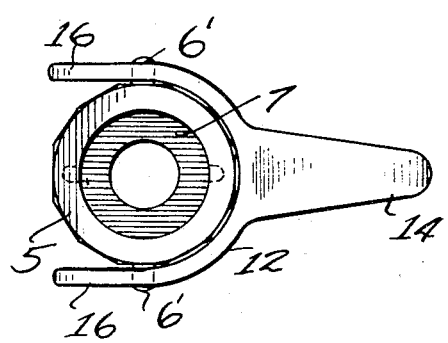
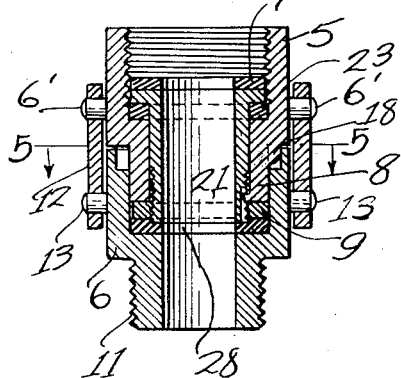
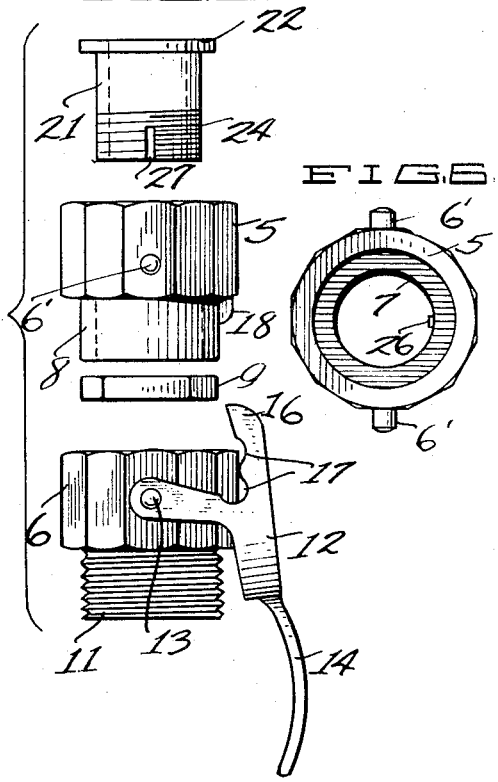
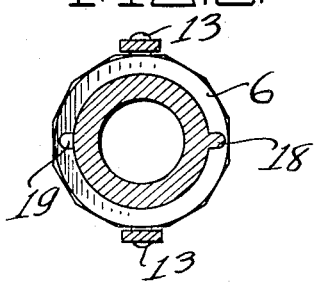
Inventor
WILLIAM B. KENNEDY.
By Victor J. Evans & Co
Attorneys.

Patented Sept. 12, 1933

1,926,949

UNITED STATES PATENT OFFICE 1,926,949

HOSE COUPLING

William B. Kennedy, Los Angeles, Calif.

Application July 15, 1932. Serial No. 622,727

2 Claims. (Cl. 285—161)

This invention relates to improvements in hose couplings.

The principal object of the invention is to produce a coupling which is quickly detachable.

A further object is to produce a device which is simple to operate.

A further object is to produce a device which is economical to manufacture.

A still further object is to produce a coupling wherein the parts will not be easily deranged and one wherein an efficient seal will be caused.

Other objects and advantages will be apparent during the course of the following description.

In the accompanying drawing forming a part of this specification and in which like numerals are employed to designate like parts throughout the same, Fig. 1 is a side elevation as the same would appear in use, Fig. 2 is a top plan view of Fig. 1, Fig. 3 is a side elevation of the parts in position ready to be assembled, Fig. 4 is a cross sectional view on the line 4—4 of Fig. 1, Fig. 5 is a cross sectional view on the line 5—5 of Fig. 4, and Fig. 6 is a top plan view of the male member of the coupling.

Hose couplings usually consist of a male and female member which are threaded so as to be joined together by rotating the two parts in order to cause the threads to engage each other. This results in the twisting of the hose to which the couplings are attached, and as a result a quick breaking down of the fabric of the hose occurs. Applicant has devised a connector wherein it is merely necessary to attach to the faucet or delivery end of the hose a permanent coupling and to attach to the portion of the hose to be secured thereto, a co-acting coupling and to then bring these couplings together and by a simple manipulation of a lever to cause the joining of these two couplings thereto a water-tight joint.

In the accompanying drawing wherein for the purpose of illustration is shown a preferred embodiment of my invention, the numeral 5 designates the male member of my coupling and the numeral 6 the female member of my coupling. The male member threadedly engages, for example, a faucet and has extending therefrom pins 6'. A gasket 7 engages the end of the faucet and seals this male member to the faucet, in a manner to be later described. The lower portion of this member has a reduced end 8 which is adapted to enter the female member 6 and to contact a nut 9. This female member 6 has a reduced threaded end 11 which is adapted to engage the customary female member of a hose. Secured to the member 6 is a yoke 12 pivoted as at 13 and having a handle 14 attached thereto. This yoke has arms 16 having depressions 17 which are adapted to engage the pins 6'. A lug 18 is formed upon the projection 8 and serves to position the male member with respect to the female member so that the pins 6' will also be in correct position to be engaged by the arms 16. This projection 18 enters slots 19 formed in the female member.

In Figs. 3 and 4 I have shown an adjusting bushing 21 which has a head 22 which rests upon a washer 23 carried in the male member. This bushing is threaded as at 24 so as to be engaged by the nut 9 and in order to prevent this bushing from rotating with respect to the male member when the nut 9 is screwed thereon, I provide a pin 26 which engages a slot 27 in the bushing 21. A washer 28 is adapted to be engaged by the lower end of the bushing 21 so as to effect a seal therewith.

The manner of assembling my device is as follows:

Assuming that the parts are in the position of Figs. 1 and 4 and the male member is connected to a faucet and the female member is connected to a hose, the water may pass from the faucet to the hose without possibility of leaking. To remove the female member from the male member it is merely necessary to move the yoke from the full line position of Fig. 1 to the dotted line position of Fig. 1, after which the separation may take place. Due to the fact that manufacturers of washers do not maintain a standard as to thickness, it is necessary to provide for these varying thicknesses. This I have done through the use of my bushing, and by tightening or loosening the nut 9 I can compress or release the washer 23 which will make the end of the bushing 21 project slightly or a greater distance sufficiently below the bottom of the male member so as to form a good contact with the washer 28, thus it will be noted that by adjusting the nut 9 I can accommodate for various thicknesses of washer. The adjusting nut and bushing also take up wear on the handle.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a male member and a female member adapted to engage one another, a washer positioned in said female member, a bushing mounted in said male member, a nut secured to said bushing and threadedly engaging the female engaging end of said male member whereby said bushing may be adjustably projected from said male member to contact said washer, said bushing having a head, and a resilient member interposed between said head and said male member.

2. In a device of the character described, a male member and a female member adapted to engage one another, a washer positioned in said female member, a bushing mounted in said male member, a nut secured to said bushing and threadedly engaging the female engaging end of said male member whereby said bushing may be adjustably projected from said male member to contact said washer, said bushing having a head, a resilient member interposed between said head and said male member, and means for preventing rotation of said bushing with respect to said male member.

WILLIAM B. KENNEDY.